Figure 3:
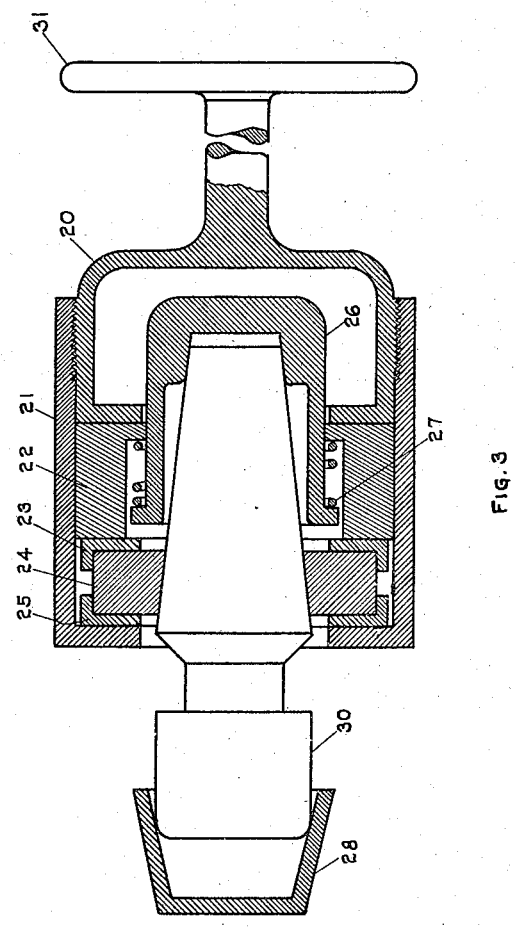

W. H. TICHBORNE.
CENTERING MECHANISM FOR GLASS ARTICLES.
APPLICATION FILED JUNE 21, 1916.
1,223,219.
Patented Apr. 17, 1917.
2 SHEETS—SHEET 1.
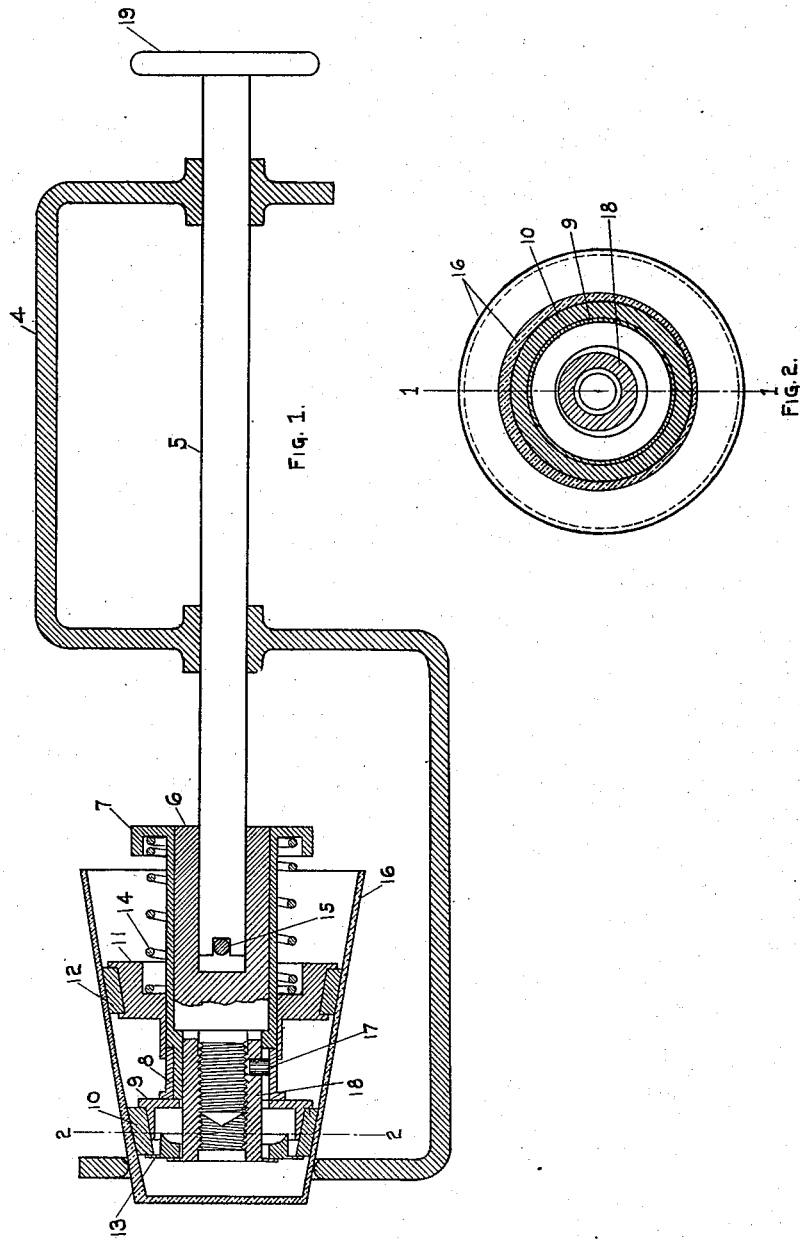
WITNESSES:
INVENTOR.
William H Tichborne
BY
ATTORNEY.

W. H. TICHBORNE.
CENTERING MECHANISM FOR GLASS ARTICLES.
APPLICATION FILED JUNE 21, 1916.

1,223,219.

Patented Apr. 17, 1917.
2 SHEETS—SHEET 2.

WITNESSES:

INVENTOR.
William H. Tichborne
BY
ATTORNEY.

UNITED STATES PATENT OFFICE.

WILLIAM H. TICHBORNE, OF WHEELING, WEST VIRGINIA.

CENTERING MECHANISM FOR GLASS ARTICLES.

1,223,219.        Specification of Letters Patent.        Patented Apr. 17, 1917.

Application filed June 21, 1916. Serial No. 104,921.

*To all whom it may concern:*

Be it known that I, WILLIAM H. TICHBORNE, residing at Wheeling, in the county of Ohio and State of West Virginia, have invented a new and useful Improvement in Centering Mechanisms for Glass Articles and the like.

My invention relates to centering mechanisms used for locating and holding glass articles or other similar articles so that some surface or dimension will remain concentric with a fixed axis while cutting, grinding, or other operations are performed on the surface of the article, and especially for holding glassware and similar articles, the inside and outside surfaces of which are likely to be nonconcentric.

One object of my invention is to provide a mechanism that will hold an article by pressure on one cylindrical or conical surface thereof in such a manner that another cylindrical or conical surface shall be concentric with the spindle of the holder whether the two said surfaces are or are not concentric.

Another object of my invention is to provide a holder capable of clamping quickly and holding firmly glass articles or other fragile articles without injury to the articles.

Another object of my invention is to provide a centering mechanism which shall hold an article by exerting equal radial pressure at all points around a cylindrical or conical surface of the article whether such surface be or be not concentric with the spindle of the holder.

Another object of my invention is to provide a centering mechanism which shall be simple and cheap to construct, easy to operate, and not likely readily to get out of order.

I attain these objects with the mechanisms illustrated in the accompanying drawings in which Figure 1 is a longitudinal section of the mechanism along the line 1, 1 Fig. 2; Fig. 2 is a cross-section along the line 2, 2 on Fig. 1; and Fig. 3 is a longitudinal section of a different form of mechanism embodying my invention. The form shown in Figs. 1 and 2 is intended to hold a hollow article such as a tumbler by pressure against the inside surface thereof while the form shown in Fig. 3 is intended to hold an article such as a glass stopper for a bottle by pressure on the outside thereof.

Similar numerals refer to similar parts in Figs. 1 and 2.

Looking now at Figs. 1 and 2, the numeral 4 refers to the supporting frame and centering gage. Figure 5 is the main spindle. It is supported in two bearings in the member 4, and the member 4 also has in it a larger hole which is in alinement with the two bearings, and also with the spindle 5. 6 is the main body of the work holder, and slips over the spindle 5, and is prevented from turning independently of said spindle by the pin 15. 7 is a member which fits over 6, and is free to turn independent of 6. The largest diameter of the member 7 is preferably knurled to afford a good grip to the hand. 8 is a member which normally forms a part of 7, and is made separate therefrom only for assembling the mechanism, or taking it apart. 9 is an annular member which rests against 8, and has a hole through it of sufficient size to allow considerable clearance about the member 18. 10 is a ring of rubber or similar elastic material which fits over the conical shoulder on 9, and against the radial shoulder. 13 is an annular member which like 9, has considerable clearance about 18. The members 9, 10, and 13 together form a unit which is free to move laterally, but is held against longitudinal movement by the shoulder on 8 and the shoulder on 18. 11 is a member for approximately centering the upper part of the article. 12 is a cushion of rubber or other similar material to prevent injury to the work, and 14 is a spring which normally urges the member 11 to the left. 15 is a pin which locks 6 against turning independently of 5. 16 is the article to be centered and held, in this case, it is a small tumbler. 17 is a pin in the member 18 which works in a longitudinal slot in the member 7. 18 is a member which screws over a threaded extension on the member 6 which is caused to turn with the member 7, and prevented from turning independently of the member 7 by the pin 17. Member 18 also has a shoulder at one end which normally rests against the member 13. 19 is a handwheel for turning spindle 5.

Referring now to Fig. 3, 20 is the main spindle member of one form of the mechanism. 21 is a cap that screws over 20 and is preferably knurled on the outside to afford a good grip. 22 is an annular member which serves to hold the end-centering member 26, and transmits pressure from 20 to 23. 23 and 25 are annular holders for the ring 24 which is composed of rubber or other elastic material. 26 is a guide for centering the end of the article. 27 is a spring which urges the guide 26 toward the left. 28 is a gage which is held in alinement with member 20 by means not shown in the figure and which permits the movement of 20 and 28 toward and from each other without disturbing the alinement.

The operation of the device is as follows, taking up first the form shown in Figs. 1 and 2.

The spindle 5 is drawn toward the right and the member 6 is slipped over and turned so that the pin 15 engages the slot in the end of 5, the article to be held, in this case a glass tumbler having previously been slipped over the rubber rings 10 and 12. The shaft 5 is then pushed to the left until the outside of the tumbler, near the bottom, fits into the large hole in the member 4. This brings the outside of the tumbler concentric with the spindle 5. It is frequently the case that the inside and outside surfaces of glassware are nonconcentric, and, therefore, if the article is alined simply by expanding a mandrel, the axis of which is fixed, then the outside of the article will be out of alinement with that axis. The tumbler shown is out of true, the upper side being thicker than the lower side. This throws the member comprising the ring 10 and the members 9, and 13 out of center. The knurled portion of the member 7 is now held with the hand so that it cannot turn, and the handwheel 19 is turned in such a direction as to move the member 18 to the right. This clamps the combined member consisting of 9, 10, and 13 so that it is no longer free to move laterally, but is now held in the eccentric position which it has assumed as a result of being forced into the eccentric portion of the tumbler, and in which position it must remain if the outside of the tumbler is to remain in alinement with the spindle 5. In addition to clamping the combined member 9, 10, and 13, turning the spindle 5 so as to screw the member 18 toward the right compresses the rubber ring 10 axially and this causes it to expand radially and to press against the inner surface of the tumbler so as to hold it firmly. Meanwhile the ring 12 has been pushed down into the glass by the spring 14, and has approximately centered the upper portion of the glass. I find by experience that for fluting and similar operations which are usually performed on the lower part of the glass, it is not necessary to correct lack of concentricity between the inner and outer faces of glass near the top. This is partly because most of the work is done near the bottom of the glass, and partly because the top in practice is found not to be so far out of true.

The spindle may then be drawn to the right and work may be done upon the tumbler without removing the member 6 from the spindle, or the member 6 may be slipped off the spindle, the member 6 carrying with it, of course, all of the other clamping members, and the glass, and may be slipped over a similar spindle on some machine on which grinding or other work is to be done on the glass.

Looking now at Fig. 3, this form of the device is intended to hold a solid article such as a glass stopper for a bottle, and to center it with respect to a surface which may be out of alinement with the surface by which it is held. The article is lined up first by the two gages 26 and 28. If the part of the article in contact with the rubber ring 24 is now eccentric, the whole member consisting of the rubber ring and members 23 and 25 will be eccentric. The handwheel 30 is now turned so as to compress the rubber ring through the intermediate members 20, 22, and 23, and this makes the rubber ring expand radially inward and clamps the article to be held. The action is substantially the same in principle as the other form.

The word spindle as used herein is intended to mean the main rotatable work supporting member which is carried in fixed bearings and is rotated to turn the work with respect to the tool while maintaining the work in alinement with a fixed axis. The word spindle as I use it would include the spindles of such machines as a milling machine, a lathe, a special machine such as I have shown in Fig. 1, the frame of which would perhaps be called a jig, and the table of such a machine as a boring mill. In other words by spindle I mean any work supporting member carried in fixed bearings and rotatable with respect thereto. By a work holding member I mean the member which comes directly in contact with the work and clamps it, and which is carried by the work supporting member.

The function of parts 4 and 5 may readily be performed by the spindle of an ordinary lathe in connection with a common cup center or other suitable gage carried by the tailstock without departing in any way from the spirit of my invention.

I claim—

1. In a centering mechanism the combination of a spindle and a work holding member and means for rigidly locking said work holding member to said spindle in any position relative thereto, either in alinement therewith, or within a prescribed limit of eccentricity therefrom.

2. In a centering mechanism the combination of a spindle and a work holding member and means for rigidly locking said work holding member to said spindle in any position relative thereto, either in alinement therewith, or within a prescribed limit of eccentricity therefrom, and means for simultaneously clamping the work to said work holding member.

3. In a centering mechanism the combination of a spindle, a gage in alinement therewith, a work holding member loosely carried by said spindle so as to have lateral play relative thereto, means for moving said spindle and said gage toward and away from each other while maintaining their relative alinement, and means for fastening said work holding member and said spindle together in any relative position that they are free to assume.

4. In a centering mechanism the combination of a spindle, a gage in alinement therewith, a work holding member loosely carried by said spindle so as to have lateral play relative thereto, means for moving said spindle and said gage toward and away from each other while maintaining their relative alinement, and means for fastening said work holding member and said spindle together in any relative position that they are free to assume, and means for simultaneously clamping the work to said work holding member.

5. In a centering mechanism, an annular ring of elastic material mounted so as to be free to move radially through a distance in any direction, and means for locking said ring in any position against movement in a radial plane, and means for compressing said ring axially.

6. In a centering mechanism, the combination of a main body member, having a threaded projection on it, a spindle carrying the same, an annular member rotatable with respect thereto, a clamping member threaded to fit the threaded projection on said body member, and held against rotation independent of said annular member, and a flexible ring carried by the said annular member and said clamping member, and having lateral play with respect thereto and in such a position that it will be compressed axially when said annular member and said clamping member are brought toward each other.

7. In a centering mechanism, the combination of a spindle, a centering ring in alinement therewith and movable axially with respect thereto, a second centering ring having lateral play with respect to said spindle, means for locking said second ring in any position against lateral play, and means for fastening to said second ring the article to be held.

8. In a centering mechanism, the combination of a spindle, a rubber ring for supporting the work to be held, a gage for alining the work with the spindle, means for locking said rubber ring while it is in contact with the work in its then position relative to said spindle, and for compressing said rubber ring axially so as to force it radially against the work.

WILLIAM H. TICHBORNE.

Witnesses:
 KENT B. HALL,
 JESSIE BEETE.

Copies of this patent may be obtained for five cents each, by addressing the "Commissioner of Patents, Washington, D. C."